United States Patent
Horng et al.

(10) Patent No.: US 9,846,226 B2
(45) Date of Patent: Dec. 19, 2017

(54) MOTION DETECTION DEVICE

(71) Applicant: National Sun Yat-sen University, Kaohsiung (TW)

(72) Inventors: Tzyy-Sheng Horng, Kaohsiung (TW); Fu-Kang Wang, Kaohsiung (TW); Yen-Chen Chiu, Kaohsiung (TW)

(73) Assignee: National Sun Yat-sen University, Kaohsiung (TW)

( * ) Notice: Subject to any disclaimer, the term of this patent is extended or adjusted under 35 U.S.C. 154(b) by 396 days.

(21) Appl. No.: 14/664,906

(22) Filed: Mar. 22, 2015

(65) Prior Publication Data

US 2016/0187475 A1 Jun. 30, 2016

(30) Foreign Application Priority Data

Dec. 25, 2014 (TW) .................................. 103145467

(51) Int. Cl.
*G01S 13/52* (2006.01)
*G01S 13/56* (2006.01)
*G01S 13/88* (2006.01)
*G01S 13/00* (2006.01)

(52) U.S. Cl.
CPC ............ *G01S 13/003* (2013.01); *G01S 13/52* (2013.01); *G01S 13/56* (2013.01); *G01S 13/88* (2013.01)

(58) Field of Classification Search
CPC ........ G01S 13/003; G01S 13/02; G01S 13/50; G01S 13/52; G01S 13/56; G01S 13/88; G01S 7/02; G01S 7/28; G01S 7/285; G01S 7/288; G01S 15/02; G01S 15/50; G01S 15/58; H04B 1/38
See application file for complete search history.

(56) References Cited

U.S. PATENT DOCUMENTS

| 4,198,618 A * | 4/1980 | Kleinschmidt | G01S 15/58 342/28 |
| 4,600,889 A * | 7/1986 | Rugen | G01S 7/288 331/12 |
| 2008/0254756 A1* | 10/2008 | Kawakubo | H04B 1/38 455/208 |

* cited by examiner

*Primary Examiner* — Bernarr E Gregory
(74) *Attorney, Agent, or Firm* — JCIPRNET

(57) ABSTRACT

A motion detection device is provided. The motion detection device includes a first antenna, a voltage-controlled oscillator, a phase detector and a signal processing unit. The first antenna receives a first signal generated by a second signal reflected by a target object, so as to output the first signal to the phase detector or the voltage-controlled oscillator. The voltage-controlled oscillator receives first signal or the second signal and receives a frequency adjustment signal, so as to generate an oscillating signal according to the frequency adjustment signal and the one of the first signal and the second signal. The phase detector receives the oscillating signal and another one of the first signal and the second signal, and generates a first phase output signal and a second phase output signal. The signal processing unit estimates motion parameters of the target object according to the first and the second phase output signal.

14 Claims, 5 Drawing Sheets

MOTION DETECTION DEVICE

CROSS-REFERENCE TO RELATED APPLICATION

This application claims the priority benefit of Taiwan application serial no. 103145467, filed on Dec. 25, 2014. The entirety of the above-mentioned patent application is hereby incorporated by reference herein and made a part of this specification.

BACKGROUND

Technical Field

The disclosure is directed to a sensing apparatus and more particularly, to a motion detection device using radio frequency (RF) waves.

Description of Related Art

With development of technologies, various portable electronic apparatuses and wearable electronic apparatuses have been vigorously developed. For wearing comfort and portable convenience, the portable electronic apparatuses and the wearable electronic apparatuses are developed toward being compact-size, which causes difficulty and inconvenience to the finger touch operations. Therefore, in order to allow users to operate the portable electronic apparatuses and the wearable electronic apparatuses more intuitively and conveniently, a concept that a human is a controller has become one of the major study researches in recent years. By means of movements of body extremities, a user can operate an electronic product equipped with a three-dimensional motion sensing technique more intuitively and conveniently. Currently available applications of the motion sensing techniques include a contact type (such as data glove systems and electromyography (EMG) control apparatuses) and a non-contact type (such as non-contact image recognition systems and Doppler radars), which can provide various body motion sensing methods for human-computer interaction interfaces.

A Doppler radar utilizes electromagnetic waves for sensing, which is provided with high sensibility and sensing capability for crossing obstacles, and thus, becomes highly anticipated. In year 2013, Fadel Adib et al. from Massachusetts Institute of Technology (MIT) proposed a Wi-Fi system using a Wi-Fi signal with a known frequency and modulation scheme as a radar transmission source, which is operated with an Inverse Synthetic aperture radar (ISAR) technique for tracking a moving target object after walls. However, this system has low resolution for recognizing motions of the target object, which causes difficulty to the application in short-distance gesture detection. In addition, Qifan Pu et al. from University of Washington proposed a WiSee system utilizing a specific Wi-Fi signal for gesture sensing. In this WiSee system, each sub-channel in a signal has to be modulated for transmitting a mass of information with continuity by means of orthogonal frequency-division multiplexing (OFDM) to improve signal spectral resolution, such that a Doppler frequency shift induced by a hand motion cam be detected. Apparently, the aforementioned methods requires modulated signals which are specifically processed for the motion sensing, which cause limitations to application environments. Besides, all currently available spatial gesture sensing systems have insufficient sensibility for detecting human physiological parameters, such as respiration, heart rates.

SUMMARY

Accordingly, the disclosure is directed to a motion detection device capable of directly utilizing a signal transmitted by a mobile communication apparatus or a wireless modulation signal from the surroundings as a radar radiation source required for sensing, so as to improve usefulness and reduce power consumption of the motion detection device.

The disclosure provides a motion detection device, including a first antenna, a voltage-controlled oscillator, a phase detector and a signal processing unit. The first antenna receives a first signal generated through a second signal reflected by a target object and is coupled to one of the phase detector and the voltage-controlled oscillator, so as to output the first signal to the phase detector or the voltage-controlled oscillator. The voltage-controlled oscillator receives a frequency adjustment signal and one of the first signal and the second signal, so as to generate an oscillating signal according to the frequency adjustment signal and the one of the first signal and the second signal. The phase detector is coupled to the voltage-controlled oscillator, receives the oscillating signal and another one of the first signal and the second signal and accordingly generates a first phase output signal and a second phase output signal. The signal processing unit is coupled to the phase detector and the voltage-controlled oscillator, receives the first phase output signal and the second phase output signal, outputs the frequency adjustment signal to the voltage-controlled oscillator and estimates motion parameters of the target object according to the first phase output signal and the second phase output signal. In addition, the frequency adjustment signal is configured to induce an adjustable time delay.

In an embodiment of the disclosure, the motion detection device further includes a directional coupler. The directional coupler has a first input terminal and a second input terminal. The first input terminal or the second input terminal is coupled to the first antenna to receive the first signal. The first input terminal or the second input terminal receives the second signal. The directional coupler further couples one of the first signal and the second signal to the phase detector and couples another one of the first signal and the second signal to the voltage-controlled oscillator.

In an embodiment of the disclosure, the directional coupler couples the second signal to the first antenna, so as to emit the second signal via the first antenna.

In an embodiment of the disclosure, the motion detection device further includes a second antenna. The second antenna is coupled to the first input terminal or the second input terminal of the directional coupler, such that the directional coupler receives the second signal via the second antenna. The directional coupler couples the second signal received by the second antenna to the first antenna to emit the second signal via the first antenna, such that the target object reflects the second signal sent by the first antenna to generate the first signal.

In an embodiment of the disclosure, the motion detection device further includes a terminator. The terminator is coupled to the first input terminal or the second input terminal of the directional coupler, so as to reflect the second signal received by the first antenna.

In an embodiment of the disclosure, the phase detector includes a first power splitter, a quadrature power splitter, a first mixer and a second mixer. The first power splitter receives the another one of the first signal and the second signal, so as to generate a first channel signal and a second channel signal according to the other one of the first signal and the second signal. The quadrature power splitter is coupled to the voltage-controlled oscillator to receive the oscillating signal and generate a no-phase-shift oscillating signal and a phase-shift oscillating signal according to the oscillating signal. The first mixer is coupled to the first power splitter and the quadrature power splitter and mixes frequencies of the first channel signal and the no-phase-shift oscillating signal, so as to generate the first phase output signal. The second mixer is coupled to the first power splitter and the quadrature power splitter and mixing frequencies of the second channel signal and the phase-shift oscillating signal, so as to generate the second phase output signal.

In an embodiment of the disclosure, the phase detector further includes a low noise amplifier (LNA). The LNA is coupled between the first power splitter and the first antenna and amplifies the another one of the first signal and the second signal.

In an embodiment of the disclosure, the phase detector further includes a first low pass filter (LPF) and a second low pass filter (LPF). The first LPF is coupled between the first mixer and the signal processing unit and configured to filter high-frequency noise from the first phase output signal. The second LPF is coupled between the second mixer and the signal processing unit and configured to filter high-frequency noise from the second phase output signal.

In an embodiment of the disclosure, the motion detection device further includes second antenna and a second power splitter. The second power splitter receives the second signal. The second power splitter is coupled between the second antenna and the voltage-controlled oscillator, so as to divide the second signal into two signals to be respectively output to the second antenna and the voltage-controlled oscillator, wherein the second antenna emits the second signal. The first antenna is coupled to the phase detector, so as to output the first signal generated by the second signal reflected by the target object to the phase detector.

In an embodiment of the disclosure, the motion detection device further includes a second antenna and a second power splitter. The second power splitter receives the second signal. The second power splitter is coupled between the second antenna and the phase detector, so as to divide the second signal into two signals to be respectively output to the second antenna and the phase detector, wherein the second antenna emits the second signal. The first antenna is coupled to the voltage-controlled oscillator, so as to output the first signal generated through the second signal reflected by the target object to the voltage-controlled oscillator.

In an embodiment of the disclosure, the first antenna receives the first signal and the second signal, and the phase detector includes a quadrature power splitter, a first mixer and a second mixer. The quadrature power splitter is coupled to the voltage-controlled oscillator to receive the oscillating signal and generate a no-phase-shift oscillating signal and a phase-shift oscillating signal according to the oscillating signal. The first mixer is coupled to the first antenna and the quadrature power splitter, mixes frequencies of the first channel signal and the no-phase-shift oscillating signal, so as to generate the first phase output signal, wherein the first channel signal is the first signal or the second signal. The second mixer is coupled to the first antenna and the quadrature power splitter and mixes frequencies of the second channel signal and the phase-shift oscillating signal, so as to generate the second phase output signal, wherein the second channel signal is the first signal or the second signal.

In an embodiment of the disclosure, the signal processing unit the signal processing unit performs arctangent demodulation on the first phase output signal and the second phase output signal, so as to generate a baseband signal and estimate the motion parameters of the target object according to the baseband signal.

In an embodiment of the disclosure, the second signal is a radio frequency (RF) signal complying with a wireless protocol, and the motion parameters comprises one of or a combination of a displacement, a moving speed, a heart rate and a respiratory rate of the target object.

In an embodiment of the disclosure, the motion detection device is disposed in a mobile communication apparatus, and the second signal is an internal RF signal generated by the mobile communication apparatus or an external RF signal received by the mobile communication apparatus.

To sum up, the motion detection device of the disclosure does not have to generate a transmitter signal source by itself, and can utilize internal transmitter signals generated by the mobile communication apparatus or external modulation signals from the surroundings as a radar radiation source required for sensing. Thereby, the motion detection device is not limited to specific application environments and have useful characteristics, such as low system complexity and low power consumption. Moreover, the motion detection device of the disclosure is adaptive for short-distance motion sensing and thus, can be used to sense human vital signs, which contributes to improving practical application of the motion detection device.

In order to make the aforementioned and other features and advantages of the disclosure more comprehensible, several embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1A:
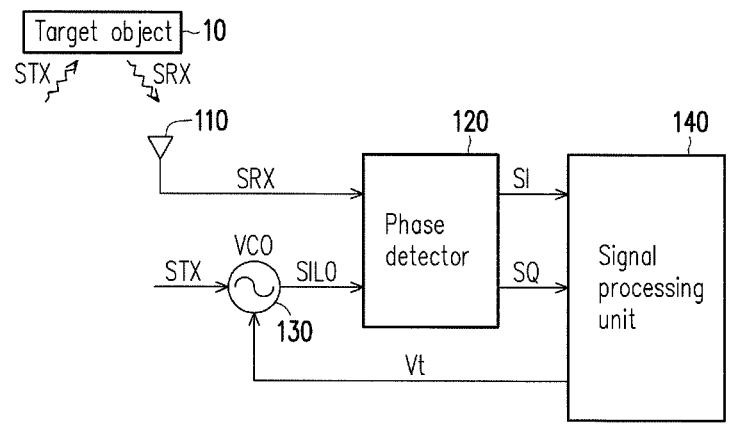
FIG. 1A is a schematic structural diagram illustrating a motion detection device according to an embodiment of the disclosure.

Reference will now be made in detail to the exemplary embodiments of the disclosure, examples of which are illustrated in the accompanying drawings. Wherever possible, the same reference numbers are used in the drawings and the description to refer to the same or like parts.

The disclosure is directed to a motion detection device capable of detecting a gesture and vital signs of a user within a short distance by means of injection-type quadrature receivers and a passive radar detection technique. In the disclosure, the motion detection device does not have to generate and emit a detection signal source by itself, but uses a radio frequency (RF) signal generated by a communication module of a mobile communication apparatus or wireless modulation signal from the surroundings as a detection signal source. Hence, the motion detection device can utilizes a wireless modulation signal (e.g., a Gaussian minimum shift keying (GMSK) signal, a quadrature phase shift keying (QPSK) signal or a quadrature amplitude modulation (64QAM) signal) commonly available from the surroundings as a detection signal source for detecting movements of a target object. In order to make the content of the disclosure clearer, the following embodiments are illustrated as examples that can be truly implemented by the disclosure.

Figure 1B:
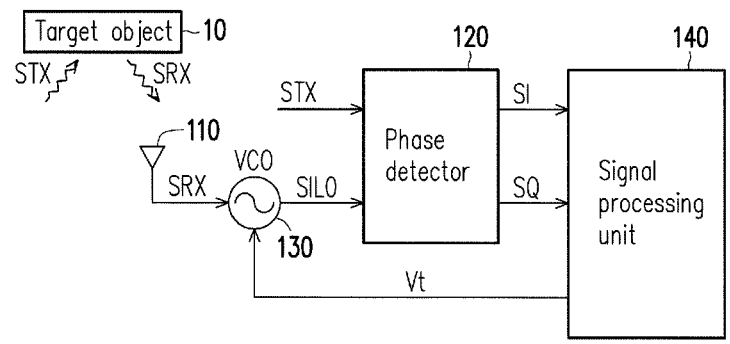
FIG. 1B is a schematic structural diagram illustrating a motion detection device according to an embodiment of the disclosure.

FIG. 1A and FIG. 1B are a schematic structural diagrams illustrating a motion detection device according to an embodiment of the disclosure. Referring to FIG. 1A first, a motion detection device includes a first antenna 110, a voltage-controlled oscillator 130, a phase detector 120 and a signal processing unit 140. The first antenna 110 receives a first signal SRX generated through a second signal STX reflected by a target object 10. Furthermore, when a second signal STX in atmospheric space hits the target object 10, the target object 10 reflects the second signal STX so as to generate the first signal SRX. In the present embodiment, the first antenna 110 is coupled to the phase detector 120, and thus, the first antenna 110 may receive the first signal SRX and output the first signal SRX to the phase detector 120.

The second signal STX may be an external wireless modulation signal received by the motion detection device via the first antenna 110 or another antenna. In this case, said another antenna and the first antenna 110 may be disposed on the same electronic apparatus, or on different electronic apparatuses. Additionally, the second signal STX may also be a RF signal generated by a communication module located in the same electronic apparatus as the motion detection device of the present embodiment. In a scenario where the second signal STX is the RF signal generated by a communication module located in the same electronic apparatus as the motion detection device, the second signal STX is sent via the first antenna 110 or another antenna disposed in the same electronic apparatus.

In an embodiment, the second signal STX may be an RF signal complying with a wireless protocol. The wireless protocol may be the third generation mobile (3G) protocol, the long term evolution (LTE) protocol, the global system for mobile (GSM) protocol, the wireless fidelity (WiFi) protocol or any other type of the wireless local network (WLAN) protocol, which is not limited in the disclosure.

As described above, in the embodiment illustrated in FIG. 1A, the first antenna 110 is coupled to the phase detector 120 to output the first signal SRX to the phase detector 120. The voltage-controlled oscillator 130 receives the second signal STX and a frequency adjustment signal Vt, so as to generate an oscillating signal SILO according to the second signal STX and the frequency adjustment signal Vt. In addition, as being influenced by the second signal STX, an oscillation frequency of the voltage-controlled oscillator 130 is influenced. The oscillating signal SILO output by the voltage-controlled oscillator 130 varies with the second signal STX.

In other words, the second signal STX is input to an injection signal input port of the voltage-controlled oscillator 130, such that the voltage-controlled oscillator 130 is operated in an injection-locked state. Additionally, a time delay of the voltage-controlled oscillator 130 may be adjusted according to the frequency adjustment signal Vt output by the signal processing unit 140. In other words, the signal processing unit 140 outputs the frequency adjustment signal Vt to the voltage-controlled oscillator 130, and the frequency adjustment signal Vt may be configured to not only control an initial oscillation frequency of the voltage-controlled oscillator 130, but also induce an adjustable time delay. In the embodiment illustrated in FIG. 1A, the frequency adjustment signal Vt causes influence to a time delay between the oscillating signal SILO and the second signal STX.

The phase detector 120 is coupled to the voltage-controlled oscillator 130, receives the oscillating signal SILO and the first signal SRX and accordingly generates a first phase output signal SI and a second phase output signal SQ. The signal processing unit 140 is coupled to the phase detector 120 and the voltage-controlled oscillator 130, receives the first phase output signal SI and the second phase output signal SQ and accordingly, estimates motion parameters of the target object 10 according to the first phase output signal SI and the second phase output signal SQ. The motion parameters may include one of or a combination of a displacement, a moving speed, a heart rate and a respiratory rate of the target object 10.

To be specifically, the second signal STX in the space is reflected or influenced by the target object 10 to generate the first signal SRX of which a phase is additionally modulated. The first signal SRX is received via the first antenna 110 so as to input into one of two input terminals of the phase detector 120. On the other hand, the voltage-controlled oscillator 130 locked by the second signal STX generates and outputs the oscillating signal SILO to another one of the two input terminals of the phase detector 120. The phase detector 120 compares the first signal SRX with the oscillating signal SILO to generate the first phase output signal SI and the second phase output signal SQ, and the first phase output signal SI and the second phase output signal SQ have phase modulation information generated with respect to the target object 10.

In an embodiment, the signal processing unit 140 performs arctangent demodulation on the first phase output signal SI and the second phase output signal SQ, so as to generate a baseband signal and estimate the motion parameters of the target object 10 according to the baseband signal. Furthermore, the arctangent demodulation is mathematically expressed by expression (1) as follows.

$$SBB(t) = \tan^{-1}\left(\frac{-SQ(t)}{SI(t)}\right) \quad (1)$$

Therein, SBB(t) represents the baseband signal, SI(t) represents the first phase output signal SI, and SQ(t) represents the second phase output signal SQ. In simple terms, SBB(t) involves with a Doppler phase shift angle induced by the target object 10. Therefore, the signal processing unit 140 may calculate a shift amount and a movement speed of the target object 10 according to the Doppler phase shift angle.

Referring to FIG. 1B, FIG. 1B illustrates a motion detection device similar to the motion detection device illustrated in FIG. 1A, but is different therefrom in the coupling manner of the first antenna 110 receiving the first signal SRX. As shown in FIG. 1B, the first antenna 110 is coupled to the voltage-controlled oscillator 130 to output the first signal SRX to the voltage-controlled oscillator 130. The voltage-controlled oscillator 130 receives the first signal SRX and the frequency adjustment signal Vt, so as to generate the oscillating signal SILO according to the first signal SRX and the frequency adjustment signal Vt. Similarly, as being influenced by the first signal SRX, the oscillation frequency of the voltage-controlled oscillator 130 is influenced. The oscillating signal SILO output by the voltage-controlled oscillator 130 varies with the first signal SRX. In other words, the first signal SRX is input to the injection signal input port of the voltage-controlled oscillator 130, such that the voltage-controlled oscillator 130 is operated in the injection-locked state. The signal processing unit 140 outputs the frequency adjustment signal Vt to the voltage-controlled oscillator 130, and the frequency adjustment signal Vt may be configured to not only control the initial oscillation frequency of the voltage-controlled oscillator 130, but also induce an adjustable time delay. In the embodiment illustrated in FIG. 1B, the frequency adjustment signal Vt causes influence to a time delay between the oscillating signal SILO and the first signal SRX.

In the embodiment illustrated in FIG. 1B, the phase detector 120 is coupled to the voltage-controlled oscillator 130, receives the oscillating signal SILO and the second signal STX and accordingly generates the first phase output signal SI and the second phase output signal SQ. In this way, the signal processing unit 140 may estimate the motion parameters of the target object 10 according to the first phase output signal SI and the second phase output signal SQ. Therein, the baseband signal generated after modulating the first phase output signal SI and the second phase output signal SQ involves with phase modulation information induced by target object 10.

That is, when the motion detection device of the disclosure is disposed in a mobile communication apparatus, the second signal STX may be an internal RF signal generated by a communication module of the mobile communication apparatus or an ambient RF signal received by the mobile communication apparatus. In addition, when the motion detection device of the disclosure is solely designed as a single device with a source for generating the wireless modulation signal, the second signal STX may be an ambient RF signal received by the motion detection device via an internal antenna.

Figure 2:
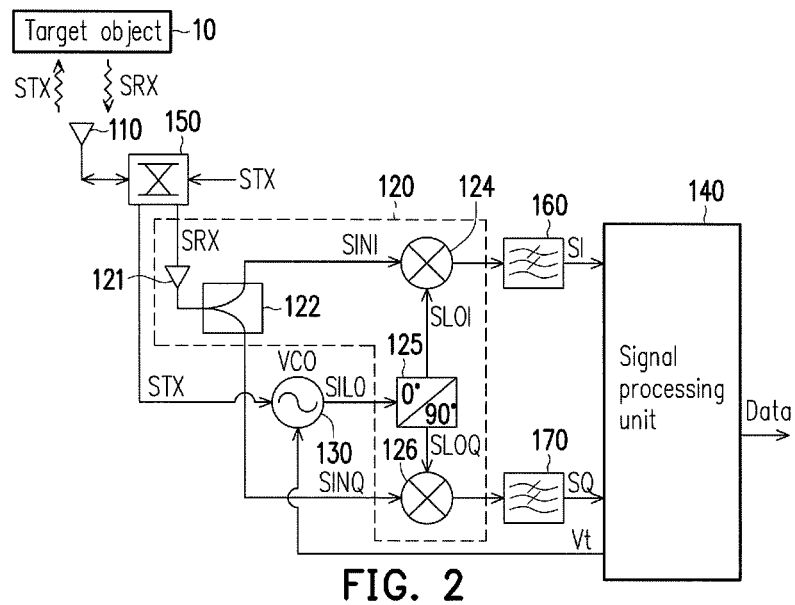
FIG. 2 is a schematic diagram illustrating a motion detection device according to an embodiment of the disclosure.

To describe the disclosure in detail, FIG. 2 is a schematic diagram illustrating a motion detection device according to an embodiment of the disclosure. Referring to FIG. 2, FIG. 2 illustrates a motion detection device including not only the first antenna 110, the phase detector 120, the voltage-controlled oscillator 130 and the signal processing unit 140, but also a directional coupler 150, a first low pass filter (LPF) 160 and a second LPF 170. Furthermore, the phase detector 120 in the present embodiment includes a low noise amplifier (LNA) 121, a first power splitter 122, a first mixer 124, a quadrature power splitter 125 and a second mixer 126.

Referring to FIG. 2, the directional coupler 150 has a first input terminal and a second input terminal. The first input terminal of directional coupler 150 is coupled to the first antenna 110, and the second input terminal receives the second signal STX. In the present embodiment, the directional coupler 150 may couple the second signal STX to the first antenna 110, so as to emit the second signal STX via the first antenna 110. Based on Doppler effect, due to the second signal STX being influenced by respiration, heartbeats or body movements of the target object 10, a frequency of the reflected first signal SRX is different from a frequency of the second signal STX sent by the first antenna 110.

The directional coupler 150 receives the reflected first signal SRX via the first antenna 110, further couples the first signal SRX to the phase detector 120 and couples the second signal STX to the voltage-controlled oscillator 130. The voltage-controlled oscillator 130 generates the oscillating signal SILO according to the second signal STX in the injection-locked state and outputs the oscillating signal SILO to the phase detector 120. The LNA 121 of the phase detector 120 is coupled between the first power splitter 122 and the first antenna 110, amplifies the first signal SRX received by the first antenna 110 and outputs the amplified first signal SRX to the first power splitter 122.

The first power splitter 122 receives the amplified first signal SRX to generate a first channel signal SINI and a second channel signal SINQ according to the amplified first signal SRX. In other words, the first power splitter 122 splits the first signal SRX into two signals and outputs the first channel signal SINI to the first mixer 124 and outputs the second channel signal SINQ to the second mixer 126.

The quadrature power splitter 125 is coupled to the voltage-controlled oscillator 130 to receive the oscillating signal SILO and generate a no-phase-shift oscillating signal SLOI and a phase-shift oscillating signal SLOQ according to the oscillating signal SILO. A phase of the no-phase-shift oscillating signal SLOI is different from a phase of the phase-shift oscillating signal SLOQ for 90 degrees, i.e., the no-phase-shift oscillating signal SLOI and the phase-shift oscillating signal SLOQ are orthogonal to each other.

The first mixer 124 is coupled to the first power splitter 122 and the quadrature power splitter 125 and mixes frequencies of the first channel signal SINI and the no-phase-shift oscillating signal SLOI, so as to generate the first phase output signal SI. The second mixer 126 is coupled to the first power splitter 122 and the quadrature power splitter 125 and mixes frequencies of the second channel signal SINQ and the phase-shift oscillating signal SLOQ, so as to generate the second phase output signal SQ. In addition, the first LPF 160 is coupled between the first mixer 124 and the signal processing unit 140 and configured to filter high-frequency noise from the first phase output signal SI. The second LPF 170 is coupled between the second mixer 126 and the signal processing unit 140 and configured to filter high-frequency noise from the second phase output signal SQ.

Specifically, the first antenna 110 transmits the second signal STX toward the target object 10, and the reflected first signal SRX generates a corresponding Doppler phase shift due to the movements of the target object 10. The first signal SRX is received and then coupled to an input port of the LNA 121 in the same way. After the first signal SRX passes through the LNA 121 and the first power splitter 122, two output terminals of the first power splitter 122 respectively output the first channel signal SINI and the second channel signal SINQ to RF terminals of the I/Q mixers (the mixer 124 and the mixer 126). After the second signal STX is injected into the voltage-controlled oscillator 130, phase information with respect to the output oscillating signal SILO will be the same as phase information with respect to the second signal STX. After the oscillating signal SILO is input into the quadrature power splitter 125, the quadrature power splitter 125 respectively outputs the no-phase-shift oscillating signal SLOI and the phase-shift oscillating signal SLOQ a local oscillation (LO) terminal of the I/Q mixers. After being mixed by the I/Q mixers and filtered by the LPFs, the first phase output signal SI and the second phase output signal SQ are respectively output to the signal processing unit 140. In the present embodiment, the signal processing unit 140 obtains the Doppler phase shift induced by the target object 10 by means of the arctangent demodulation, so as to estimate a motion parameter Data of the target object 10.

Figure 3:
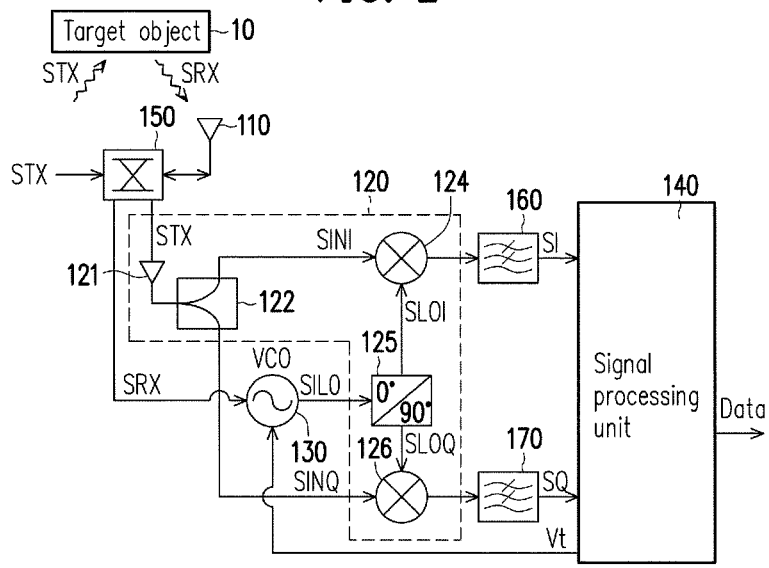
FIG. 3 is a schematic diagram illustrating a motion detection device according to an embodiment of the disclosure.

FIG. 3 is a schematic diagram illustrating a motion detection device according to an embodiment of the disclosure. Referring to FIG. 3, the embodiment of FIG. 3 is similar to the embodiment of FIG. 2. FIG. 3 illustrates a motion detection device including not only the first antenna 110, the phase detector 120, the voltage-controlled oscillator 130 and the signal processing unit 140, but also the directional coupler 150, the first LPF 160 and the second LPF 170. Furthermore, the phase detector 120 of the present embodiment includes the LNA 121, the first power splitter 122, the first mixer 124, the quadrature power splitter 125 and the second mixer 126.

Each element illustrated in FIG. 3 functions in the same way as or similarly to each element illustrated in FIG. 2, though the embodiment illustrated in FIG. 2 is different from the embodiment illustrated in FIG. 3 in the manner of the directional coupler 150 coupling the signals. Referring to FIG. 3, the first input terminal of directional coupler 150 illustrated in FIG. 3 receives the second signal STX, and the second input terminal is coupled to the first antenna 110. The directional coupler 150 first couples the second signal STX to the first antenna 110, such that the first antenna 110 transmits the second signal STX toward the target object 10. The first signal SRX is generated by the second signal STX reflected by the target object. Thus, the first antenna 110 receives the first signal SRX, and the directional coupler 150 couples the first signal SRX received by the first antenna to the voltage-controlled oscillator 130. On the other hand, the directional coupler 150 also couples the second signal STX received by the second input terminal to the phase detector 120. In accordance with the descriptions related to FIG. 1B and FIG. 2, persons with ordinary skills in the art may understand that the motion detection device illustrated in FIG. 3 may also estimate the motion parameters of the target object according to the second signal STX generated by the communication module of the mobile communication apparatus.

Figure 4:
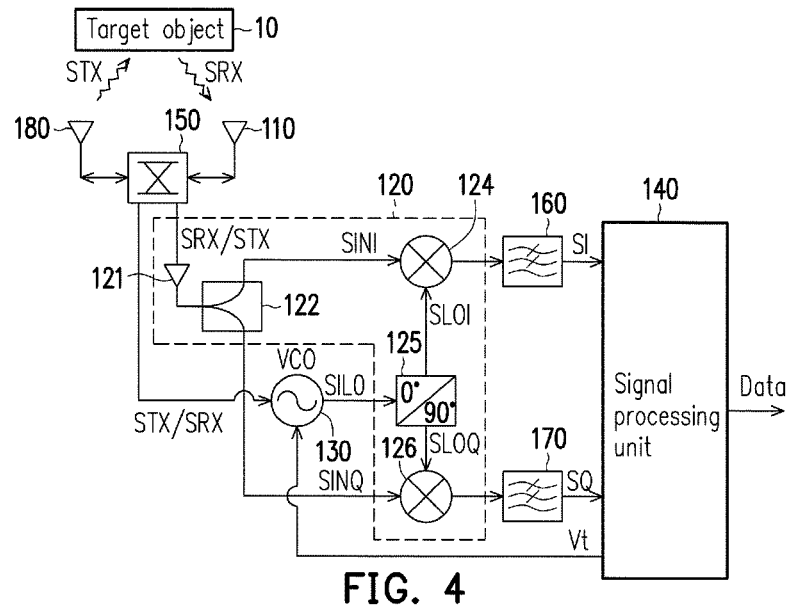
FIG. 4 is a schematic diagram illustrating a motion detection device according to an embodiment of the disclosure.

FIG. 4 is a schematic diagram illustrating a motion detection device according to an embodiment of the disclosure. Referring to FIG. 4, the embodiment illustrated in FIG. 4 is similar to the embodiment illustrated in FIG. 2. FIG. 4 illustrates a motion detection device including not only the first antenna 110, the phase detector 120, the voltage-controlled oscillator 130, the signal processing unit 140, the directional coupler 150, the first LPF 160 and the second LPF 170, but also a second antenna 180 coupled to the directional coupler 150. Moreover, the phase detector 120 of the present embodiment is similar to the phase detector illustrated in FIG. 2 and FIG. 3 and will not be repeatedly described hereinafter.

It should be specially mentioned that the motion detection device further includes the second antenna 180 in the embodiment illustrated in FIG. 4. The second antenna 180 is coupled to the second input terminal of the directional coupler 150, so as to receive the second signal STX from the surroundings via the second antenna 180, and the directional coupler 150 couples the second signal STX received by the second antenna 180 to the first antenna 110, so as to emit the second signal STX via the first antenna 110. When the first antenna 110 emits the second signal STX, it induces the target object 10 to reflect the second signal STX sent by the first antenna 110 to generate the first signal SRX. Thereby, the directional coupler 150 may receive the first signal SRX via the first antenna 110.

In addition, based on the structure illustrated in FIG. 4, the first antenna 110 may also receive the second signal STX from the surroundings, and the directional coupler 150 couples the second signal STX received by the first antenna 110 to the second antenna 180, so as to emit the second signal STX via the second antenna 180. When the second antenna 180 emits the second signal STX, it induces the target object 10 to reflect the second signal STX emitted by the second antenna 180 to generate the first signal SRX. Thereby, the directional coupler 150 may receive the first signal SRX via the second antenna 180.

Namely, in the embodiment illustrated in FIG. 4, the second signal STX is a wireless modulation signal existing in the environment, e.g., a WiFi signal emitted by a WiFi access point (AP) or an LTE signal emitted by a LTE base station, which is not limited in the disclosure. Accordingly, the motion detection device illustrated in FIG. 4 may utilize the wireless modulation signal currently existing in the surroundings as a detection signal source, instead of generating a detection signal source on its own.

In brief, both the first antenna 110 and the second antenna 180 may receive the first signal SRX and the second signal STX, output one of the first signal SRX and the second signal STX to the phase detector 120 and output the other one of the first signal SRX and the second signal STX to the voltage-controlled oscillator 130. In this way, the phase detector 120 may then compare one of the first signal SRX and the second signal STX with the oscillating signal SILO generated by the voltage-controlled oscillator 130, so as to generate the first phase output signal SI and the second phase output signal SQ with Doppler phase shift information, and the signal processing unit 140 may also estimate the motion parameters of the target object 10 according to the first phase output signal SI and the second phase output signal SQ.

Figure 5:
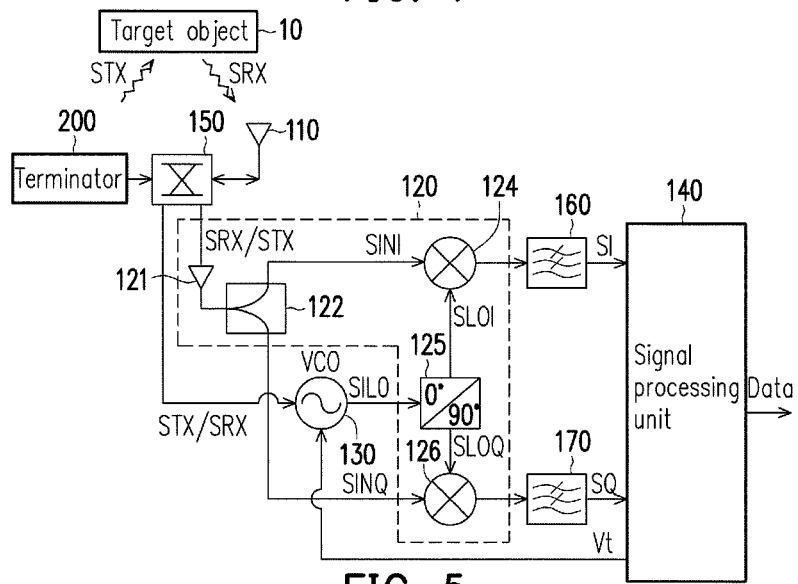
FIG. 5 is a schematic diagram illustrating a motion detection device according to an embodiment of the disclosure.

FIG. 5 is a schematic diagram illustrating a motion detection device according to an embodiment of the disclosure. Referring to FIG. 5, the embodiment illustrated in FIG. 5 is similar to the embodiment illustrated in FIG. 4. FIG. 5 illustrates a motion detection device including the first antenna 110, the phase detector 120, the voltage-controlled oscillator 130, the signal processing unit 140, the directional coupler 150, the first LPF 160 and the second LPF 170. Being different from the embodiment in FIG. 4, the motion detection device illustrated in FIG. 5 only includes the first antenna 110, but further includes a terminator 200 coupled to the directional coupler 150. The terminator 200 may be an open-circuit (OC) terminal, a closed-circuit (CC) terminal or a load terminal, which is not limited in the disclosure. Moreover, the phase detector 120 of the present embodiment is similar to the phase detector illustrated in FIG. 4, and will not be repeatedly described hereinafter.

It should be specially mentioned that the motion detection device further includes the terminator 200 in the embodiment illustrated in FIG. 5. The terminator 200 is coupled to the first input terminal of the directional coupler 150. Based on the structure illustrated in FIG. 5, in the case of the terminator 200 is an OC terminal or a CC terminal, the first antenna 110 may receive the second signal STX uninfluenced by the target object 10 from the surroundings, and the directional coupler 150 couples the second signal STX received by the first antenna 110 to the terminator 200 which is the OC terminal or the CC terminal, such that the terminator 200 reflects the second signal STX received by the first antenna 110.

When the terminator 200 emits the second signal STX, the target object 10 reflects the first signal SRX generated by the second signal STX sent by the terminator 200, and thereby, the first antenna 110 may receive the first signal SRX reflected by the target object 10. As described above, the voltage-controlled oscillator 130 may generate the oscillating signal SILO according to one of the first signal SRX and the second signal STX, and the phase detector 120 may perform the phase demodulation according to the other one of the first signal SRX and the second signal STX. In this way, the phase detector 120 may compare one of the first signal SRX and the second signal STX with the oscillating signal SILO generated by the voltage-controlled oscillator 130 to generate the first phase output signal SI and the second phase output signal SQ with Doppler phase shift information, and the signal processing unit 140 may also estimate the motion parameters of the target object 10 according to the first phase output signal SI and the second phase output signal SQ.

In addition, based on the structure illustrated in FIG. 5, the terminator 200 may also be a load terminal, e.g., a resistance load terminal with a resistance value of 50Ω, but the disclosure is not limited thereto. In case the terminator 200 is a load terminal, the first antenna 110 may receive the second signal STX from the surroundings and the first signal SRX reflected by the target object, and the directional coupler may couple the second signal STX from the surroundings and the first signal SRX reflected by the target object to the phase detector 120 and the voltage-controlled oscillator 130. That is, when the wireless modulation signal from the surroundings hits the target object 10, the first signal SRX may be generated due to signal reflection. Thus, when the terminator 200 is the load terminal, the motion detection device of the present embodiment simultaneously receives the second signal STX transmitted from another communication apparatus and the first signal SRX generated due to the signal reflection from the surroundings, so as to estimate the motion parameters of the target object 10 according to the first signal SRX and the second signal STX.

Figure 6:
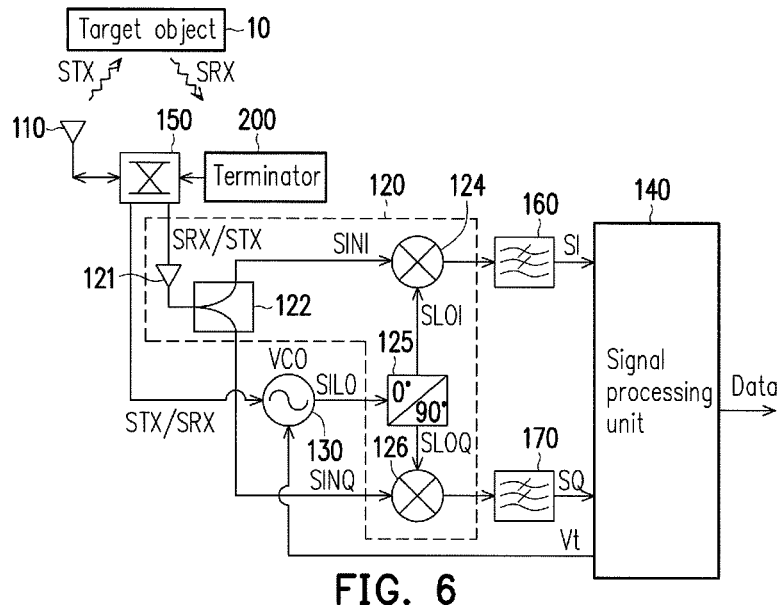
FIG. 6 is a schematic diagram illustrating a motion detection device according to an embodiment of the disclosure.

FIG. 6 is a schematic diagram illustrating a motion detection device according to an embodiment of the disclosure. Referring to FIG. 6, the embodiment illustrated in FIG. 6 is similar to the embodiment illustrated in FIG. 5. Being different from the embodiment in FIG. 5, the terminator 200 illustrated in FIG. 6 is coupled to the second input terminal of directional coupler 150, and the first antenna 110 is coupled to the first input terminal of the directional coupler 150. The operation principle of the embodiment illustrated in FIG. 6 is similar to that of the embodiment illustrated in FIG. 5, and the persons with ordinary skills in the art can derive the operation principle of the embodiment illustrated in FIG. 6 in accordance with the description related to FIG. 5 and will not be repeatedly described hereinafter.

Figure 7:
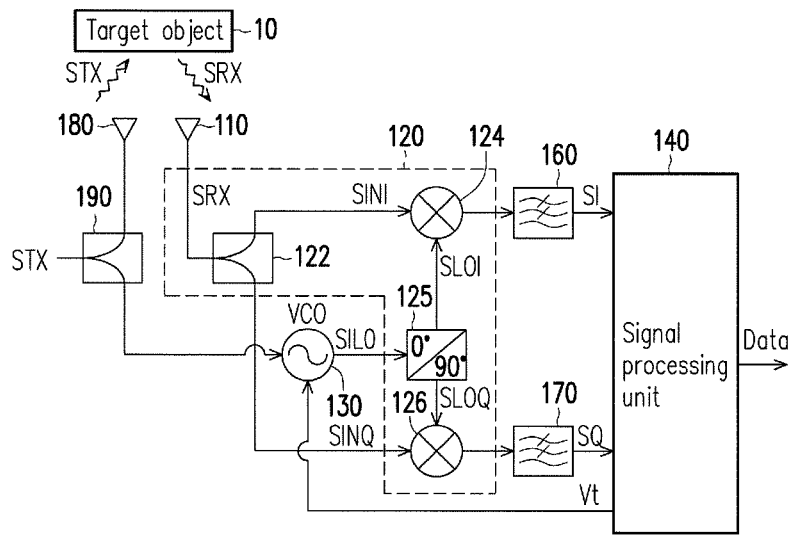
FIG. 7 is a schematic diagram illustrating a motion detection device according to an embodiment of the disclosure.

FIG. 7 is a schematic diagram illustrating a motion detection device according to an embodiment of the disclosure. Referring to FIG. 7, FIG. 7 illustrates a motion detection device including the first antenna 110, the phase detector 120, the voltage-controlled oscillator 130, the signal processing unit 140, the first LPF 160 and the second LPF 170. Being different from the embodiment in FIG. 2, the motion detection device illustrated in FIG. 7 does not include any directional coupler, but further includes the second antenna 180 and a second power splitter 190. The second power splitter 190 receives the second signal STX. The second power splitter 190 is coupled between the second antenna 180 and the voltage-controlled oscillator 130 to divide the second signal STX into two channels respectively output to the second antenna 180 and the voltage-controlled oscillator 130. Thus, the second antenna 180 emits the second signal STX, and the target object 10 reflects the second signal STX emitted by the second antenna to generate the first signal SRX. The first antenna 110 is coupled to the phase detector 120 to output the first signal SRX generated by the second signal STX reflected by the target object 10 to the phase detector 120.

Furthermore, the first antenna 110 receives the first signal SRX and directly outputs the first signal SRX to an input terminal of the first power splitter 122. The first power splitter 122 divides the first signal SRX into two channels, so as to generate the first channel signal SINI and the second channel signal SINQ. The first power splitter 122 respectively transmits the first channel signal SINI and the second channel signal SINQ to the first mixer 124 and the second mixer 126.

Similarly, the voltage-controlled oscillator 130 generates the oscillating signal SILO according to the second signal STX in the locked state, in which the oscillating signal SILO has the same phase modulation information as the second signal STX. Accordingly, the phase detector 120 may generating the first phase output signal SI and the second phase output signal SQ by means of comparing the first signal SRX with the oscillating signal SILO, and the signal processing unit 140 may also estimate the motion parameters of the target object 10 according to the first phase output signal SI and the second phase output signal SQ.

Figure 8:
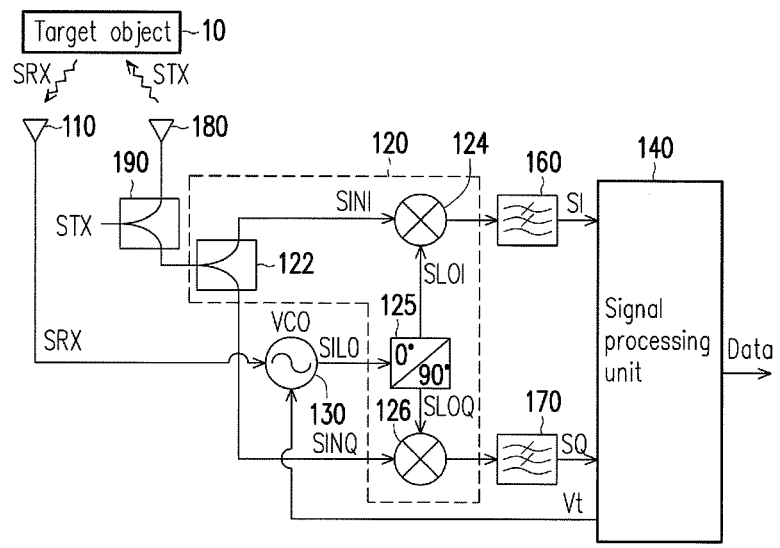
FIG. 8 is a schematic diagram illustrating a motion detection device according to an embodiment of the disclosure.

FIG. 8 is a schematic diagram illustrating a motion detection device according to an embodiment of the disclosure. FIG. 8 illustrates a motion detection device including the first antenna 110, the phase detector 120, the voltage-controlled oscillator 130, the signal processing unit 140, the first LPF 160 and the first LPF 170. Similarly, the phase detector 120 includes the first power splitter 122, the first mixer 124, the quadrature power splitter 125 and the second mixer 126. Furthermore, the motion detection device illustrated in FIG. 8 further includes the second antenna 180 and the second power splitter 190.

Being different from the embodiment in FIG. 7, the second power splitter 190 illustrated in FIG. 8 is coupled between the second antenna 180 and the phase detector 120. An input terminal of the second power splitter 190 receives the second signal STX, so as to separate the second signal STX into two signals respectively output to the second antenna 180 and the phase detector 120. In this way, when the input terminal of the second power splitter 190 receives the second signal STX, the second antenna 180 may emits the second signal STX and transmits the second signal STX to the phase detector 120. Thus, the second antenna 180 emits the second signal STX, while the target object 10 reflects the second signal STX transmitted by the second antenna to generate the first signal SRX. In addition, the first antenna 110 is coupled to the voltage-controlled oscillator 130 to output the first signal SRX generated by the second signal STX reflected by the target object 10 to the voltage-controlled oscillator 130. In an operation manner similar to that of one of the embodiments above, the phase detector 120 may compare a phase of the second signal STX with the phase of the first signal SRX which is modulated due to being reflected by the target object 10, and the signal processing unit 140 may modulate a comparison result generated by the phase detector 120 to estimate the motion parameters of the target object.

Figure 9:
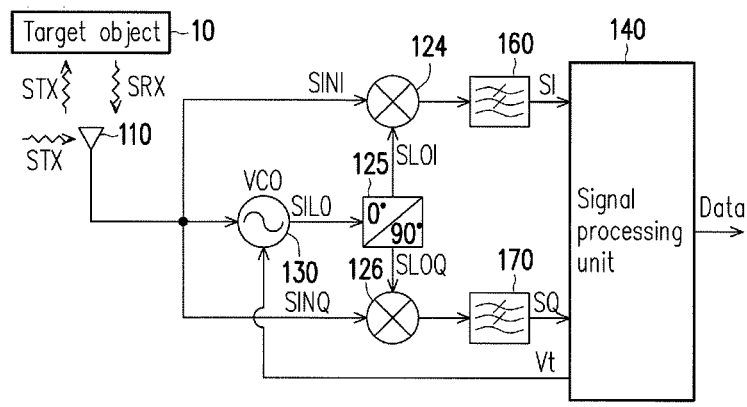
FIG. 9 is a schematic diagram illustrating a motion detection device according to an embodiment of the disclosure.

FIG. 9 is a schematic diagram illustrating a motion detection device according to an embodiment of the disclosure. It should be specially mentioned that the motion detection device of the present embodiment does not transmit the second signal STX for generating the first signal SRX, but receives and serves an ambient wireless modulation signal from the surroundings as the second signal STX. Namely, since the first signal SRX may also be generated due to signal reflection when the ambient wireless modulation signal hits the target object 10, the motion detection device of the present embodiment may simultaneously receive the second signal STX transmitted by another communication apparatus from the surroundings and the first signal SRX generated due to the signal reflection.

Referring to FIG. 9, FIG. 9 illustrates a motion detection device including the first antenna 110, the phase detector 120, the voltage-controlled oscillator 130, the signal processing unit 140, the first LPF 160 and the first LPF 170. The phase detector 120 in the present embodiment includes the first mixer 124, the quadrature power splitter 125 and the second mixer 126. Furthermore, RF input terminals of both the first mixer 124 and the second mixer 126 are coupled to the first antenna 110, and the injection signal input port of the voltage-controlled oscillator 130 is also coupled to the first antenna 110. In comparison with the embodiments illustrated in FIG. 1 through FIG. 8, the first channel signal SINI may be the first signal STX or the second signal SRX in the present embodiment. Similarly, corresponding to the first channel signal SINI, the second channel signal SINQ may be the first signal STX or the second signal SRX.

According to the descriptions related to FIG. 1 through FIG. 9, after the first antenna 110 receives the second signal STX transmitted by another communication apparatus and the first signal SRX generated due to the signal reflection, the phase detector 120, the voltage-controlled oscillator 130 and the signal processing unit 140 may perform quadrature demodulation on the second signal STX and the first signal SRX generated due to the signal reflection to obtain the Doppler phase shift induced by the target object 10, so as to estimate the motion parameters of the target object. In brief, the voltage-controlled oscillator 130 illustrated in FIG. 1 through FIG. 9 may amplify the first signal SRX or the second signal STX, retain the phase modulation information of the first signal SRX or the second signal STX and simultaneously provide a signal delay effect, so as to accurately determine a phase difference between the first signal SRX and the second signal STX.

It is worth mentioning that the disclosure is adaptive to estimate the motion parameters of the target object within a short distance, and thus, a movement speed, a relative distance or other motion parameters of an operator's hand near the motion detection device may be sensed. In this way, an electronic apparatus equipped with the motion detection device of the disclosure can recognize a gesture made by the operator, so as to execute further control and application. Besides, in a scenario that the target object is a human cardiogram or pulse, the motion detection device of the disclosure can serve as a sensor for sensing vital signs, so as to measure physiological parameters, such as a heart rate, a respiratory rate and a pulse rate of a person under the measurement. Accordingly, the motion detection device of the disclosure may be integrated in the mobile communication apparatus and sense a gesture and vital signs of the person under measurement by means of GSM, WiFi, 3G or LTE wireless modulation signals.

To summarize, in the disclosure, the motion parameters of the target object are detected by means of the passive radar detection technique, and thus, the motion detection device of the disclosure does not have to generate the signal source by itself and can utilize the internal signal generated by the mobile communication apparatus or the external modulated signal from the surroundings as a radar radiation source required for the sensing. Furthermore, in the disclosure, the gesture and vital signs of a user within a short distance are further detected by means of the modulation of the injection-type quadrature receivers. Thereby, the motion detection device of the disclosure is not limited to specific application environments, so as to have useful characteristics, such as low system complexity and low power consumption. When the motion detection device of the disclosure is disposed in the mobile communication apparatus, since no RF signal for detecting the target object is additionally generated, an issue of electromagnetic interference can be prevented. Moreover, the motion detection device of the disclosure can serve the wireless modulation signal from the surroundings as the detection signal source, and thus, the motion detection device of the disclosure can achieve the detection of the motion parameters of the target object by itself, without any other signal transmitter module. Moreover, the motion detection device of the disclosure is adaptive for short-distance motion sensing and thus, can be used to sense physiological signs of a human body, which contributes to increase the application scope of the motion detection device of the disclosure.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. A motion detection device, comprising:
   a first antenna, receiving a first signal generated through a second signal reflected by a target object;
   a voltage-controlled oscillator, receiving a frequency adjustment signal and one of the first signal and the second signal, so as to generate an oscillating signal according to the frequency adjustment signal and the one of the first signal and the second signal;
   a phase detector, coupled to the voltage-controlled oscillator, receiving the oscillating signal and another one of the first signal and the second signal and generating a first phase output signal and a second phase output signal, wherein the first antenna is coupled to one of a phase detector and a voltage-controlled oscillator, so as to output the first signal to the phase detector or the voltage-controlled oscillator; and
   a signal processing unit, coupled to the phase detector and the voltage-controlled oscillator, receiving the first phase output signal and the second phase output signal, outputting the frequency adjustment signal to the voltage-controlled oscillator and estimating motion parameters of the target object according to the first phase output signal and the second phase output signal.

2. The motion detection device according to claim 1, further comprising:
   a directional coupler, having a first input terminal and a second input terminal,
   wherein the first input terminal or the second input terminal is coupled to the first antenna to receive the first signal, and the first input terminal or the second input terminal receives the second signal,
   wherein the directional coupler couples one of the first signal and the second signal to the phase detector and couples another one of the first signal and the second signal to the voltage-controlled oscillator.

3. The motion detection device according to claim 2, wherein the directional coupler couples the second signal to the first antenna, so as to emit the second signal via the first antenna.

4. The motion detection device according to claim 2, further comprising:
a second antenna, coupled to the first input terminal or the second input terminal of the directional coupler, and the directional coupler receiving the second signal via the second antenna,
wherein the directional coupler couples the second signal received by the second antenna to the first antenna to emit the second signal via the first antenna, such that the target object reflects the second signal emitted by the first antenna to generate the first signal.

5. The motion detection device according to claim 2, further comprising:
a terminator, coupled to the first input terminal or the second input terminal of the directional coupler, so as to reflect the second signal received by the first antenna.

6. The motion detection device according to claim 1, wherein the phase detector comprises:
a first power splitter, receiving the another one of the first signal and the second signal, so as to generate a first channel signal and a second channel signal according to the another one of the first signal and the second signal;
a quadrature power splitter, coupled to the voltage-controlled oscillator to receive the oscillating signal and generate a no-phase-shift oscillating signal and a phase-shift oscillating signal according to the oscillating signal;
a first mixer, coupled to the first power splitter and the quadrature power splitter and mixing frequencies of the first channel signal and the no-phase-shift oscillating signal, so as to generate the first phase output signal; and
a second mixer, coupled to the first power splitter and the quadrature power splitter and mixing frequencies of the second channel signal and the phase-shift oscillating signal, so as to generate the second phase output signal.

7. The motion detection device according to claim 6, wherein the phase detector further comprises a low noise amplifier (LNA) coupled between the first power splitter and the first antenna and amplifying the another one of the first signal and the second signal.

8. The motion detection device according to claim 6, wherein the phase detector further comprises a first low pass filter (LPF) coupled between the first mixer and the signal processing unit and configured to filter high-frequency noise from the first phase output signal,
wherein the phase detector further comprises a second low pass filter (LPF) coupled between the second mixer and the signal processing unit and configured to filter high-frequency noise from the second phase output signal.

9. The motion detection device according to claim 1, further comprising:
a second antenna; and
a second power splitter, receiving the second signal, coupled between the second antenna and the voltage-controlled oscillator, so as to divide the second signal into two signals to be respectively output to the second antenna and the voltage-controlled oscillator, wherein the second antenna emits the second signal,
wherein the first antenna is coupled to the phase detector, so as to output the first signal generated through the second signal reflected by the target object to the phase detector.

10. The motion detection device according to claim 1, further comprising:
a second antenna; and
a second power splitter, receiving the second signal and coupled between the second antenna and the phase detector, so as to divide the second signal into two signals to be respectively output to the second antenna and the phase detector, wherein the second antenna emits the second signal,
wherein the first antenna is coupled to the voltage-controlled oscillator, so as to output the first signal generated through the second signal reflected by the target object to the voltage-controlled oscillator.

11. The motion detection device according to claim 1, wherein the first antenna receives the first signal and the second signal, and the phase detector comprises:
a quadrature power splitter, coupled to the voltage-controlled oscillator to receive the oscillating signal and generate a no-phase-shift oscillating signal and a phase-shift oscillating signal according to the oscillating signal;
a first mixer, coupled to the first antenna and the quadrature power splitter and mixing frequencies of the first channel signal and the no-phase-shift oscillating signal, so as to generate the first phase output signal, wherein the first channel signal is the first signal or the second signal; and
a second mixer, coupled to the first antenna and the quadrature power splitter and mixing frequencies of the second channel signal and the phase-shift oscillating signal, so as to generate the second phase output signal, wherein the second channel signal is the first signal or the second signal.

12. The motion detection device according to claim 1, wherein the signal processing unit performs arctangent demodulation on the first phase output signal and the second phase output signal, so as to generate a baseband signal and estimate the motion parameters of the target object according to the baseband signal.

13. The motion detection device according to claim 1, wherein the second signal is a radio frequency (RF) signal complying with a wireless protocol, and the motion parameters comprises one of or a combination of a displacement, a moving speed, a heart rate and a respiratory rate of the target object.

14. The motion detection device according to claim 1, wherein the motion detection device is disposed in a mobile communication apparatus, and the second signal is an RF signal generated by the mobile communication apparatus or an external RF signal received by the mobile communication apparatus.

* * * * *